June 4, 1935. W. E. BROWN 2,003,918
HOSE COUPLING
Filed Oct. 13, 1933

Wallace E. Brown, INVENTOR.
BY
Paul J. Culhane
ATTORNEY.

Patented June 4, 1935

2,003,918

UNITED STATES PATENT OFFICE 2,003,918

HOSE COUPLING

Wallace E. Brown, Fairfield, Conn., assignor to E. I. du Pont de Nemours & Company, Wilmington, Del., a corporation of Delaware Application October 13, 1933, Serial No. 693,467

3 Claims. (Cl. 285—71)

This invention relates to hose couplings of the type in which the hose is a flexible material such as canvas and is utilized for mine ventilation and purposes of a generally analogous character. More particularly the invention relates to improvement in the structure in the rings used in couplings of this type.

The general type of hose coupling to which this invention relates has been known for many years and is fully described in United States Patent 1,310,559 to Norman B. Braly. In this type of coupling the end of a section of hose is sewn around a sheet metal ring adapted to be contracted whereby it may be slipped through a similar ring attached to the end of another section of hose. When the two sections of hose are pulled taut the inside ring abuts against an inturned flange on the outer ring. Heretofore this inturned flange has been simply a portion of the sheet metal ring turned inward at an angle of 90°.

The above described type of coupling ring is open to two material objections, first, that it bends out of shape permanently with comparative ease when pressure is applied to it or when it is given a sudden blow such as by falling rock or the like, and secondly the inwardly turned flange is relatively sharp and in time cuts into the fabric into which it is sewn causing air leaks through the coupling.

An object of the present invention is to provide an improved coupling ring which will overcome the objections above mentioned.

A further object is to provide such a coupling ring simple in construction and economical in manufacture without sacrifice of the ease of operation and light weight of the heretofore used coupling rings.

The above objections are accomplished according to the present invention by making the coupling ring of a strip of sheet metal in circular form and contractible with an inwardly projecting bead instead of a flange.

Figure 1:
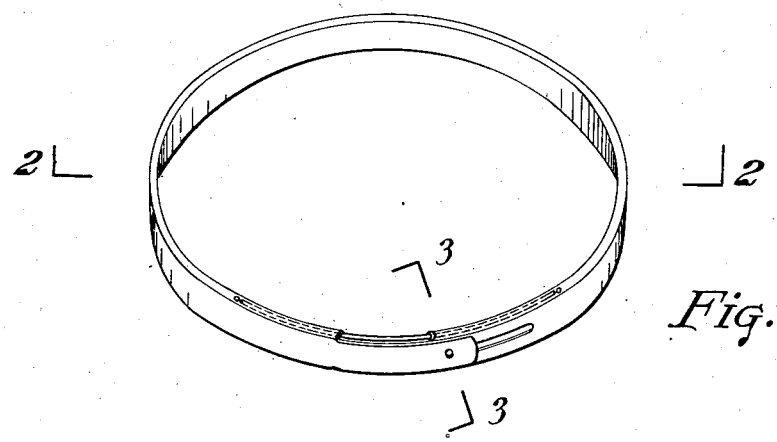
Figure 2:
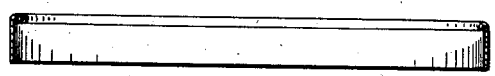
Figure 3:
Figure 4:
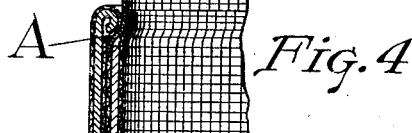

An embodiment of the invention is illustrated in the accompanying drawing, wherein Fig. 1 is a perspective view of the improved coupling ring, Fig. 2 is a view partially in elevation and partially in section through the ring at the points indicated by 2 in Figure 1, Fig. 3 is a view partially in elevation and partially in section through the ring at the place indicated by 3 in Figure 1. This view shows in section the juncture of the two ends of the ring, and Fig. 4 is a sectional view of a detail of the coupling showing the two rings of the coupling together with the hose into which the ring is sewn. The point of contact of the inturned bead with the other edge of the other coupling is marked A.

This invention may be described in connection with an example of making up a 14 inch ring in its preferred form.

A piece of 0.062 inch cold rolled spring steel about 2½ inches wide is formed into a ring about 14½ inches outside diameter. A bead is then rolled on one edge having an outside diameter of ⁵⁄₁₆ths of an inch. One end of the strip has a bead removed for about 4½ inches and is caused to overlap the other end for an inch. This end is then stamped so as to raise it 0.062 inch, thus allowing it to slide smoothly over the other end of the ring when compressing into a smaller diameter. By means of a slot in one end and a rivet in the overlapping end as shown on the drawing, the diameter of the ring is varied to accomplish the insertion of one ring into the other. To keep the edges of both ends in the same plane, a wire 0.187 inch in diameter is inserted into the bead and acts as a guide. This wire is 5¾ inches wide and is free moving, punch holes being made in the bead at each end about 3½ inches from the end of the bead to act as stops for the wire.

In use, the ring is sewn into the mine ventilating tubing or analogous material but having the end of the hose section looped inwardly about the ring, the ring being positioned with the beaded edge at the end of the tube section.

Whereas the above is an exact description of the invention, it is obvious that the dimensions can be altered without departing from the spirit of the invention. Certain details of this, of course, may be varied. Spring steel is the material most frequently used but for particular uses other resilient materials can be substituted therefor. The ends may be joined either by raising one end as in the specific example or by lowering one end in a corresponding manner. The slot may be in either end and the rivet or its equivalent projection in the other. The rivet and slot arrangement adds materially to the resistance of the ring against distortion and represent a preferred feature. When the rivet and slot are absent the unbeaded portion of the ring at the point of juncture is preferably underlapped rather than overlapped in order that the lap may receive some additional resistance against lateral distortion by bearing upon the inturned bead. In general, the guide and strengthening wire and the rivet and slot arrangement are most preferred because of the strength of the combination. The unbeaded edge may be rounded and thus smoothed, thus further reducing chafing.

The invention is of great use in connection with couplings for flexible hose such as those made from flexible canvas or rubberized fabric which are used in mines, tunnels, and similar places for supplying fresh air to the working areas.

The improved ring of the present invention has two great advantages over the prior art rings. The first is the added strength imparted by the bead. The coupling rings of the prior art are readily and permanently deformed, and this by a comparatively slight stress, such as would occur frequently in the environment to which the ring is submitted. The ring of the present on the other hand is of such strength that a man can even stand on a coupling using these rings without deforming them and without making it difficult to uncouple and recouple. The second advantage, and one of considerable importance, is that the bead has no sharp edges. In the embodiment of the invention above disclosed, the diameter of the bead is $\frac{5}{16}$ths inch. With even a smaller diameter than this there is no appreciable cutting effect upon the fabric. The fabric, therefore, does not readily develop leaks at the coupling and the tubing has, therefore, a much longer life than heretofore, together with a more efficient life inasmuch as the leakage of air from the total ventilating system is very markedly decreased.

Thus in comparative tests two rings of the type of the present invention withstood 220 and 205 lbs. compression before yielding whereas two rings of the type of the prior art withstood only 105 and 98 lbs. respectively. Also couplings using 14¾ inch rings of the type of the present invention have been coupled and uncoupled 36 times without any sign of destructive action on the tube cloth whereas couplings using 8 inch prior art rings show air leakage after 6 couplings and uncouplings, couplings using 12 inch rings leak after 12 couplings and uncouplings, and couplings using 16 inch rings leak after 24 couplings and uncouplings.

As many apparently widely different embodiments of this invention may be made without departing from the spirit and scope thereof, it is to be understood that I do not limit myself to the specific embodiment thereof except as defined in the appended claims.

I claim:

1. A detachable coupling comprising a resilient discontinuous ring, a strengthening bead on one edge thereof, a projection in one end being slidingly engaged in an elongated aperture in the other, and a strengthening and guide wire slidingly connecting the strengthening bead at the ends thereof.

2. A detachable coupling comprising a resilient discontinuous spring steel ring, a strengthening bead formed on one edge thereof, a rivet on one end of said ring slidingly engaged in a slot in the other end of said bead, and a strengthening and guide wire slidingly connecting the strengthening bead at both ends thereof.

3. A detachable coupling comprising a resilient discontinuous spring steel ring, a strengthening bead formed on one edge thereof, a rivet on one end of said ring slidingly engaged in a slot on the other end of said ring, and a strengthening and guide wire slidingly connecting the strengthening bead at both ends thereof, one end of said ring being diametrically displaced to allow free passage over the other end of said ring.

WALLACE E. BROWN.